United States Patent [19]

Baba et al.

[11] 4,436,199

[45] Mar. 13, 1984

[54] CAM-OPERATED MULTISTROKE FEED MECHANISM

[75] Inventors: Kiyokazu Baba, Komatsu; Kenji Nishida, Matsuto, both of Japan

[73] Assignee: Kabushiki Kaisha Komatsu Seisakusho, Tokyo, Japan

[21] Appl. No.: 379,447

[22] Filed: May 18, 1982

[30] Foreign Application Priority Data

Oct. 8, 1981 [JP] Japan .............................. 56-159398

[51] Int. Cl.$^3$ ............................................ B65G 25/04
[52] U.S. Cl. ................................. 198/750; 74/568 R; 198/621
[58] Field of Search ................... 198/621, 750, 751; 74/568 R; 414/749, 751

[56] References Cited

U.S. PATENT DOCUMENTS

| | | | |
|---|---|---|---|
| 2,517,079 | 8/1950 | Birdsall | 74/568 R X |
| 3,620,381 | 11/1971 | McCaughey | 198/621 X |
| 4,139,090 | 2/1979 | Nelsen | 198/621 X |

Primary Examiner—James L. Rowland

Attorney, Agent, or Firm—Armstrong, Nikaido, Marmelstein & Kubovcik

[57] ABSTRACT

In apparatus for transferring articles through a series of processing stations, a multistroke feed mechanism is operatively connected to a feed member which reciprocates for causing the transfer of the articles. The multistroke feed mechanism comprises a set of disc cams having lobes of different radii and splined to a camshaft for joint rotation therewith and sliding motion in its axial direction. A cam follower lever is arranged for abutment against any selected one of the disc cams thereby to be oscillated through a corresponding angle. For causing the axial sliding motion of the disc cams over the camshaft, a sleeve is fitted over the camshaft and secured to the cams for axial motion therewith. Formed between the camshaft and the sleeve are a pair of opposed fluid chambers for moving the sleeve to any desired position wherein a selected one of the disc cams is engaged by the cam follower lever. A linkage connects this lever to the feed member so as to translate the oscillation of the lever, through the angle determined by the selected cam, into the reciprocation of the feed member over a corresponding distance.

9 Claims, 4 Drawing Figures

CAM-OPERATED MULTISTROKE FEED MECHANISM

BACKGROUND OF THE INVENTION

Our invention relates to apparatus for feeding or transferring articles, and more specifically to a multistroke feed mechanism in such apparatus for making it possible to feed or transfer articles over any desired one of several predetermined different strokes or unit distances. The multistroke feed mechanism of our invention is particularly well adaptable for use in what is known as a three-dimensional or triaxial transfer press system wherein sheet metal is automatically transferred through succession of press stations for the fabrication of a variety of panel products such as those for use as roofing, flooring, and doors.

The multistroke feed mechanism of our invention forms, in its typical application, a part of a "transfer feeder" by which work in various stages of manufacture is conveyed through successive processing stations in the triaxial transfer press system. The "transfer feeder" includes a pair of transfer bars extending through the press system in parallel spaced relationship to each other. The transfer bars jointly reciprocate longitudinally and further move both up and down and toward and away from each other. By the repetition of these motions in a prescribed sequence the transfer bars coact to grip the work at each station and lift and transfer the work to the next station.

As heretofore constructed, the feed mechanism in the "transfer feeder" has caused longitudinal reciprocation of the transfer bars over a single preassigned distance only. The need exists, however, in the triaxial transfer press system for conveying the work over two or more different unit distances.

SUMMARY OF THE INVENTION

In consideration of the above problem encountered with transfer press and other comparable systems or machines, we seek to make it possible to feed or transfer articles over any of a plurality of different unit distances or strokes and hence to enhance the utility of the machines of this class. Our invention attains this objective with high regard to the ease with which the feed or transfer strokes are changed from one to another.

Broadly, our invention concerns apparatus of the type having a feed member which reciprocates to cause the transfer or feeding of articles. The invention deals more specifically with a multistroke feed mechanism in such apparatus for reciprocating the feed member over any desired one of several preassigned different distances. The multistroke feed mechanism comprises a set of differently profiled feed cams mounted side by side on a camshaft for joint sliding motion in its axial direction and for simultaneous rotation therewith. Arranged for engagement with one of the feed cams is a cam follower operatively linked to the feed member for reciprocating same over a distance dictated by the particular feed cam in engagement with the cam follower. A pair of opposed fluid chambers are provided which act between the set of feed cams and the camshaft for moving the former, just like the piston of a fluid actuated cylinder, to any desired position on the camshaft where a selected feed cam is engaged by the cam follower.

Thus, upon selective delivery of a fluid under pressure, usually hydraulic oil, to the pair of opposed fluid chambers, the cam follower can be made to engage a different feed cam to change the stroke of reciprocation of the feed member. A preferable embodiment of our invention disclosed herein employs solenoid valves for controlling fluid flow to and from the fluid chambers as well as fluid actuated cylinders used for activating other pertinent parts of the multistroke feed mechanism. The stroke of reciprocation of the feed member can therefore be readily altered under electrical control.

The above and other features and advantages of our invention and the manner of attaining them will become more apparent, and the invention itself will best be understood, from a study of the following description of the preferred embodiment, taken together with the attached drawings.

DESCRIPTION OF THE PREFERRED EMBODIMENT

Figure 1:
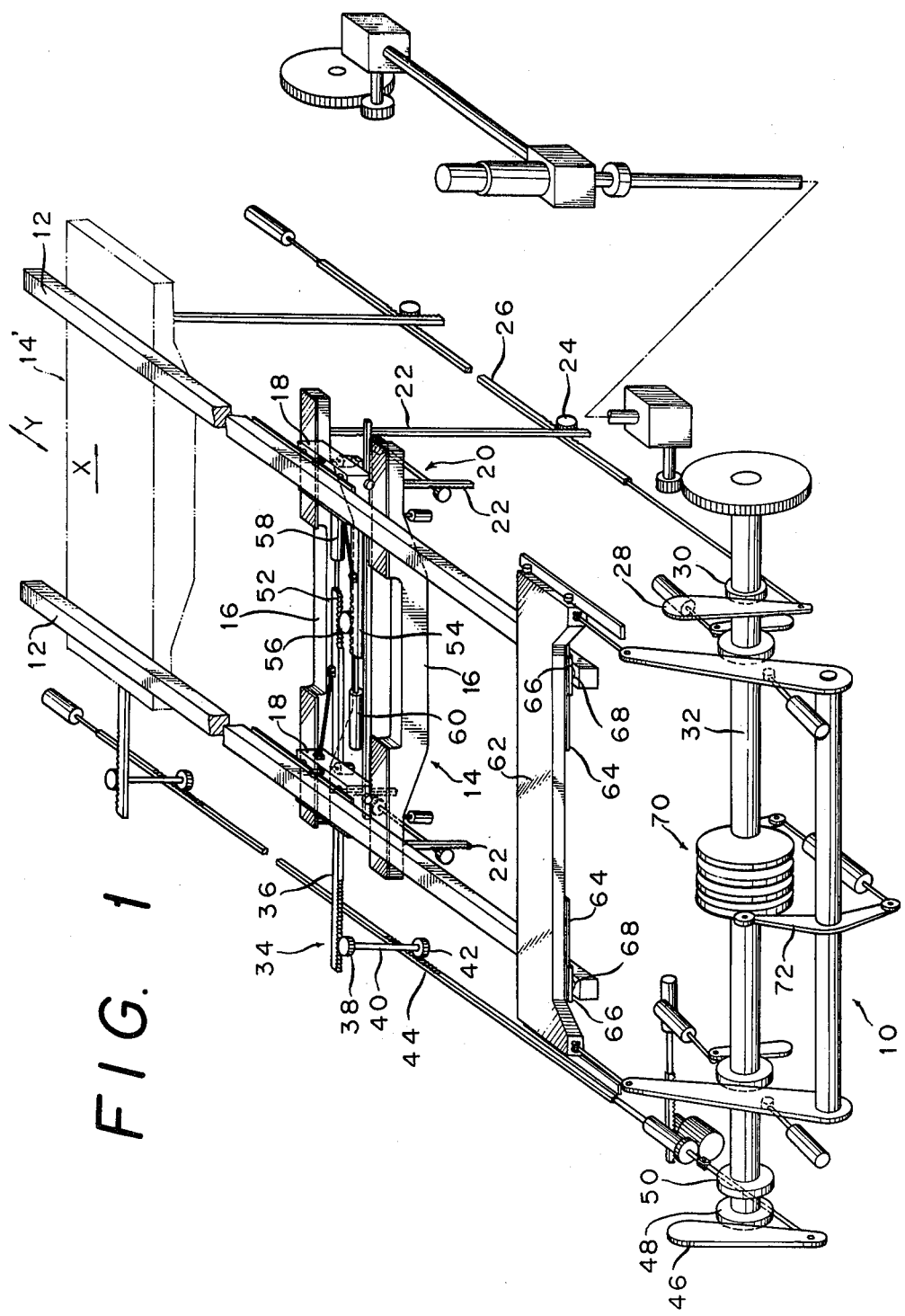
FIG. 1 is a perspective view, partly broken away for illustrative convenience, schematically illustrating the "transfer feeder" incorporating the multistroke feed mechanism of our invention.

We will now describe the multistroke feed mechanism of our invention in detail as adapted for use with the "transfer feeder" of the known triaxial transfer press system. FIG. 1 shows the general organization of the "transfer feeder" incorporating the multistroke feed mechanism generally identified by the reference numeral 10. The feeder includes a pair of transfer bars 12 extending horizontally and in parallel spaced relationship to each other. Equipped with suitable work holding means, not shown, the transfer bars 12 convey pieces of sheet metal through a series of processing stations, also not shown, of the triaxial transfer press system.

Adjacent the opposite ends of the pair of transfer bars 12 there are disposed a pair of carrier assemblies 14 and 14' carrying the transfer bars to allow their longitudinal, vertical, and lateral motions. The carrier assemblies 14 and 14' are identical in construction, so that only one of them, 14, is illustrated in detail in FIG. 1 whereas the other 14' is represented by the phantom outline. We will describe only the illustrated carrier assembly 14 in detail, it being understood that the same description applies to the other assembly 14'.

The representative carrier assembly 14 comprises a pair of parallel spaced lift carriers 16 extending transversely of the transfer bars 12. A pair of grip carriers 18 extend across the lift carriers 16 and make rolling engagement therewith for movement toward and away from each other. The grip carriers 18 carry the respective transfer bars 12 so as to allow their longitudinal motion but to restrain them from lateral displacement. Thus the transfer bars 12 are movable both laterally, as indicated by the double-headed arrow X, and longitudinally, as indicated by the double-headed arrow Y.

For imparting up-and-down motion to the transfer bars 12 there is provided a rack-and-pinion arrangement 20 including four racks 22 depending from the opposite ends of the lift carriers 16. One of the racks 22, seen at the extreme right in FIG. 1, is longer than the others and meshes with a pinion 24. Also in mesh with the pinion is another rack 26 extending horizontally and pivotally coupled at one end to a cam follower lever 28. This lever makes sliding contact with a lift cam 30 on a camshaft 32 thereby to be oscillated. With the rotation of the lift cam 30, therefore, the pair of lift carriers 16 move up and down with the transfer bars 12.

A similar cam-operated rack-and-pinion system 34 moves the transfer bars 12 toward and away from each other. The rack-and-pinion system 34 includes a rack 36 extending horizontally from the left hand grip carrier 18 and meshing with a pinion 38 on one end of an upstanding shaft 40. Another pinion 42 on the other end of this shaft meshes with a rack 44 extending parallel to the transfer bars 12. The rack 44 is pivotally coupled to a cam follower lever 46 arranged for sliding contact with either of a triaxial grip cam 48 and a biaxial grip cam 50. These cams 48 and 50 are nonrotatably mounted on the camshaft 32 for axial sliding motion. Thus the oscillation of the cam follower lever 46 results in the rolling motion of the left hand grip carrier 18 over the lift carriers 16 toward and away from the right hand grip carrier 18. For transmitting such reciprocation of the left hand grip carrier 18 to the right hand one, two offset racks 52 and 54 project from the two grip carriers toward each other. Both racks mesh with a pinion 56 lying midway between the grip carriers 18. It is thus seen that the grip carriers 18, and therefore the transfer bars 12 thereon, simultaneously travel toward and away from each other.

Seen at 58 and 60 are air cylinders having their piston rods coupled to the racks 52 and 54 respectively. These air cylinders function to bias the grip carriers 18 toward each other.

The foregoing will have made clear that the carrier assemblies 14 and 14' together with the cam-operated rack-and-pinion arrangements 20 and 34 operate to cyclically move the transfer bars 12 up and down and toward and away from each other. For the conveyance of workpieces through successive press stations the transfer bars must further reciprocate longitudinally. It is the function of the multistroke feed mechanism 10 of our invention to impart such longitudinal reciprocation to the transfer bars, over several different strokes that can be readily switched from one to another as required.

Serving to connect the transfer bars 12 to the multistroke feed mechanism 10 is a feed carrier 62 extending across the transfer bars at their forward ends. The feed carrier 62 has a pair of guide rails 64 secured to its underside, with the guide rails being arranged at right angles with the transfer bars 12. A shoe 66 pinned at 68 to each transfer bar 12 makes sliding engagement with each guide rail 64, in such a way that the transfer bars are free to move toward and away from each other but are constrained to longitudinal motion with the feed carrier 62.

Figure 2:
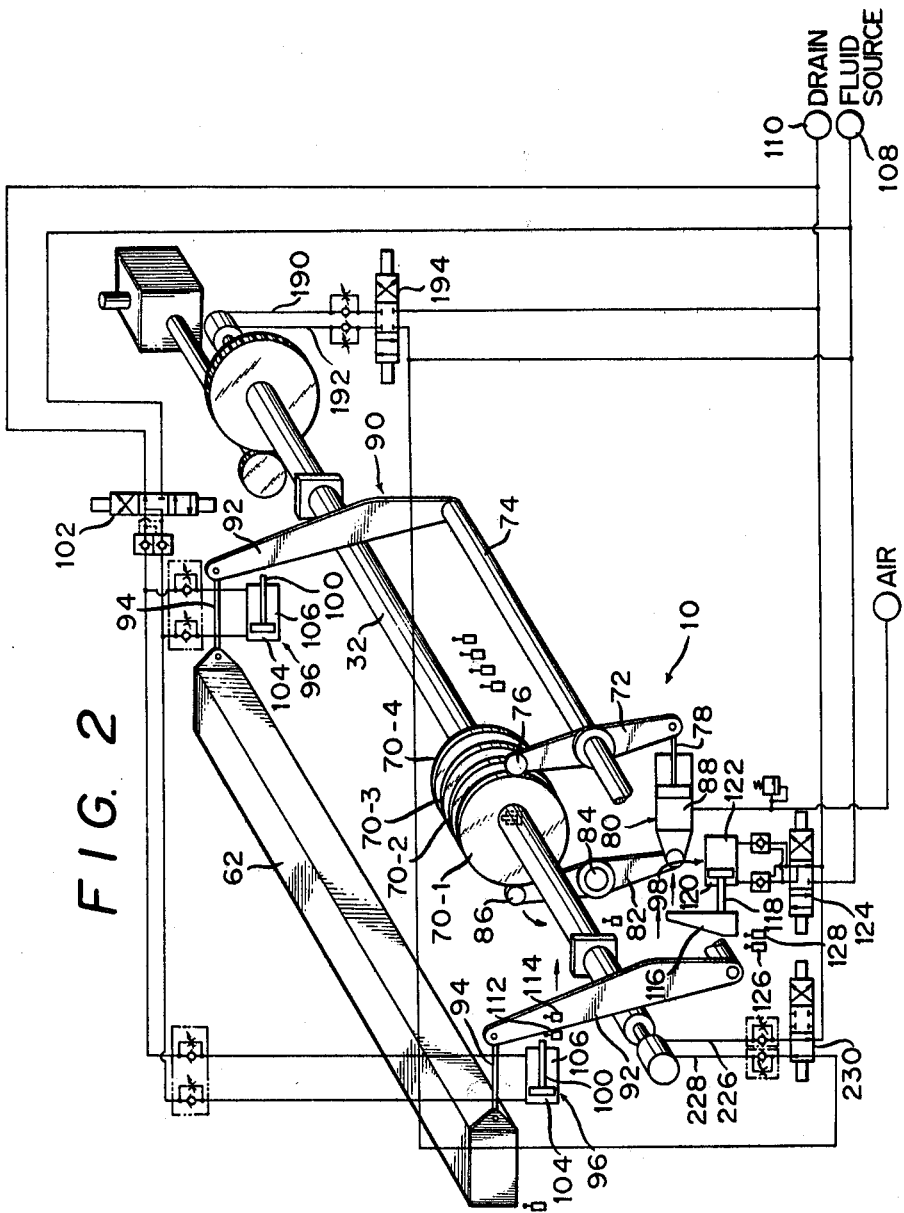
FIG. 2 is a perspective view, also partly broken away for illustrative convenience, diagrammatically illustrating the multistroke feed mechanism of FIG. 1, together with a schematic representation of a hydraulic system used in the feed mechanism.

The following is the discussion of the multistroke feed mechanism 10 forming the gist of our invention. Both FIGS. 1 and 2 show the multistroke feed mechanism quite generally and as simply as possible. It will nevertheless be seen that the feed mechanism comprises a plurality of, four in this particular embodiment, feed cams 70 mounted side by side on the camshaft 32 for simultaneous rotation therewith and for sliding motion in its axial direction. The reference numeral 70 in FIG. 1 denotes the set of four feed cams as a whole; to the individual feed cams we will refer with the numerals 70-1, 70-2, 70-3 and 70-4 as in FIG. 2. The feed cams 70 take the form of discs having lobes of different radii corresponding to the desired strokes of reciprocation of the transfer bars 12.

Disposed opposite to the feed cams 70 is a cam follower lever 72 fixedly mounted on a rotatable shaft 74 (hereinafter referred to as the cam follower shaft) parallel to the camshaft 32. The cam follower lever 72 rotatably carries a roll 76 on one end, directed upwardly of the cam follower shaft 74, for rolling engagement with the contoured periphery of any selected one of the feed cams 70. The other end of the cam follower lever 72, directed downwardly of the cam follower shaft 74, is pin-jointed to the piston rod 78 of an air cylinder 80. The head end of this air cylinder is pin-jointed to one end of a second cam follower lever 82 swingable about a pivot 84, parallel to the cam follower shaft 74, located intermediate its ends. The second cam followr lever 82 also rotatably carries a roll 86 on its other end for rolling contact with the contoured periphery of the same feed cam as the roll 76 on the first recited cam follower lever 72. The air cylinder 80 constantly receives compressed air into its head end chamber 88 for urging the rolls 76 and 86 on the levers 72 and 82 into abutment against one of the feed cams 70.

Thus, in coaction with the air cylinder 80, the second cam follower lever 82 functions to maintain the roll 76 on the first cam follower lever 72 in proper rolling engagement with one of the feed cams 70. We will therefore call the first lever 72 the main cam follower lever, and the second lever 82 the auxiliary cam follower lever.

Generally identified by the reference numeral 90 in FIG. 2, a linkage system connects the main cam follower lever 72 to the feed carrier 62 so as to translate the oscillation of the lever into the reciprocation of the feed carrier. The linkage system 90 comprises a pair of upstanding arms 92 each rigidly coupled at one end to one of the opposite ends of the cam follower shaft 74 for pivotal motion with the oscillation of the main cam follower lever 72. The free ends of these swingable arms are pivoted to a pair of links 94, respectively, which in turn are pivoted to the opposite ends of the feed carrier 62. Thus does the feed carrier reciprocate with the oscillation of the main cam follower lever 72. It will also be seen that the linkage system 90 does not interfere with the up-and-down motion of the feed carrier 62 with the pair of transfer bars 12.

The main cam follower lever 72 with the roll 76, as well as the auxiliary cam follower lever 82 with the roll 86, must move out of engagement with the feed cams 70 during the movement of these cams axially of the camshaft 32, for the reengagement of the cam follower levers with a different one of the feed cams. We employ to this end a pair of hydraulic cylinders 90 and another hydraulic cylinder 98 as in FIG. 2.

The cylinders 96 have their piston rods 100 arranged for movement into and out of abutting engagement with the respective swingable arms 92 of the linkage system 90. A solenoid-operated, four-way, three-position valve 102 selectively places the opposed fluid chambers 104 and 106 of the cylinders 96 in communication with a source 108 of hydraulic fluid under pressure or with a fluid drain 110. Upon delivery of the pressurized fluid into the head end chambers 104 of the cylinders 96, their piston rods 100 engage and pivot the swingable arms 92 in a clockwise direction as viewed in FIG. 2. The cam follower shaft 74 transmits such pivotal motion of the swingable arms 92 to the main cam follower lever 72 thereby causing the roll 76 thereon to move out of contact with one of the feed cams 70. Indicated at 112 and 114 are limit switches for electrically sensing the extension and contraction of one of the cylinders 96.

The cylinder 98 has a pusher 116 fixedly mounted on its piston rod 118 for movement into and out of abutting engagement with the head end of the air cylinder 80 connected between the cam follower levers 72 and 82. The pair of opposed fluid chambers 120 and 122 of this cylinder also communicate with the pressurized fluid source 108 and the fluid drain 110 via a solenoid valve 124 similar in construction and operation to the valve 102. Upon delivery of the pressurized fluid into the rod end chamber 120 of the cylinder 98, the pusher 116 moves as indicated by the arrow and engages and contracts the air cylinder 80. The result is the pivotal motion of the auxiliary cam follower lever 82 in a counterclockwise direction, with the consequent disengagement of the roll 86 thereon from one of the feed cams 70. Limit switches 126 and 128 limit such motion of the pusher 116.

Figure 3:
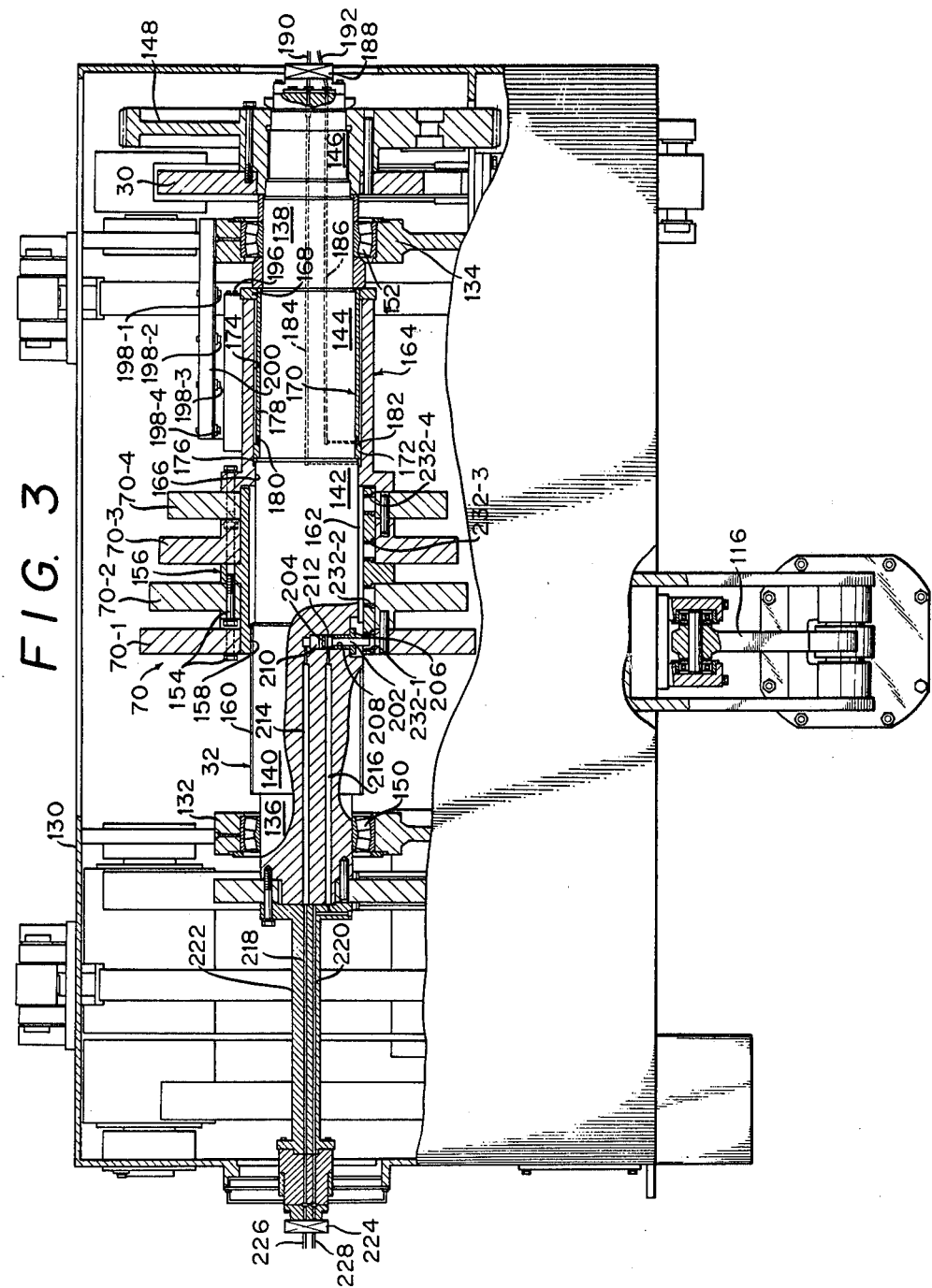
FIG. 3 is an enlarged, vertical sectional view showing part of the multistroke feed mechanism in detail.
Figure 4:
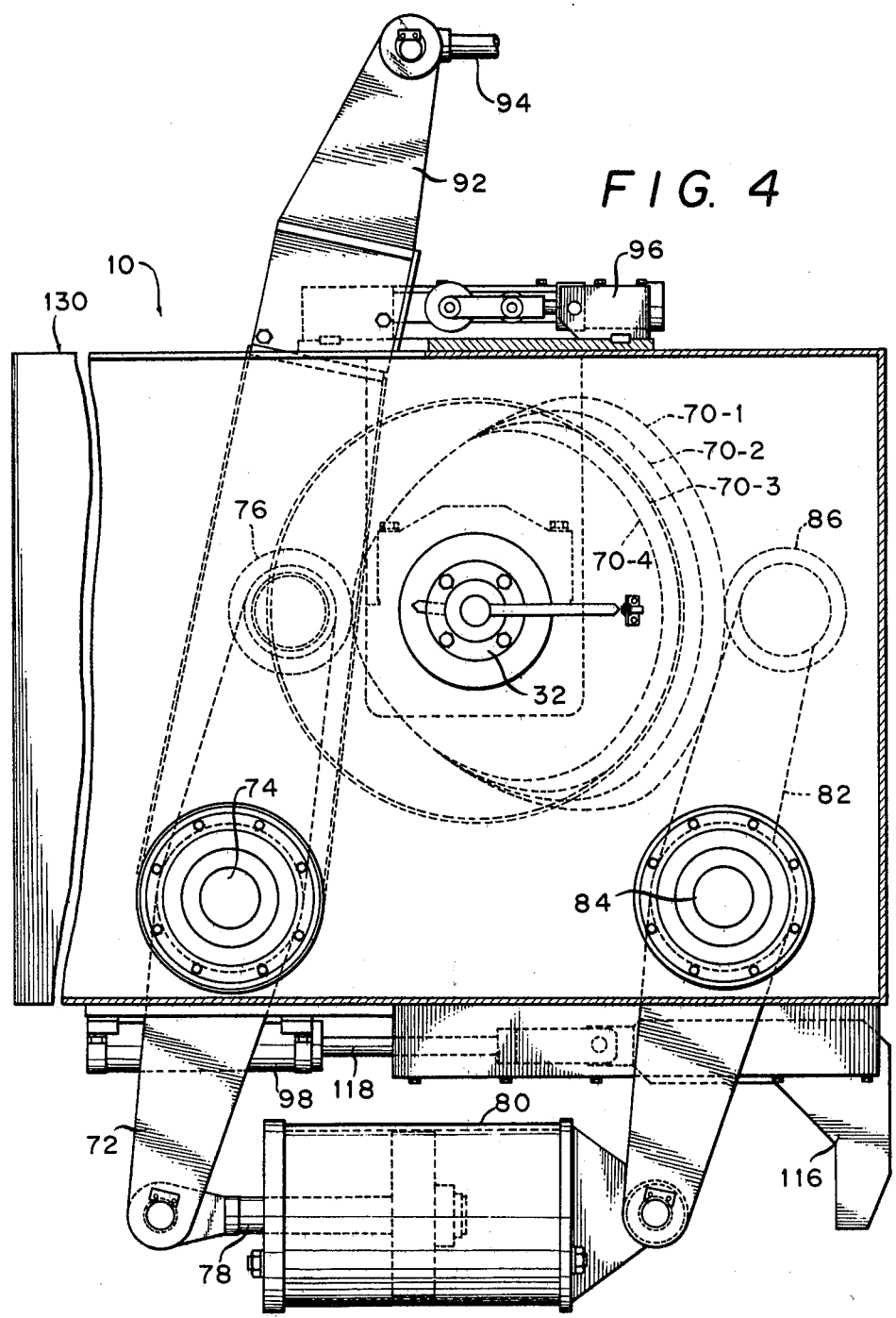
FIG. 4 is the right hand side elevational view; partly in section, of the multistroke feed mechanism of FIG. 3.

FIG. 3 is a detailed representation of the camshaft 32, the set of feed cams 70, and other means more or less directly associated therewith. FIG. 4 also shows in detail and in side view the complete multistroke feed mechanism 10. An inspection of these figures, wherein the parts appearing also in FIGS. 1 and 2 are identified by their reference numerals, will make clear the preferred form which the feed mechanism takes in the practice of our invention.

With reference to FIG. 3 in particular it will be noted that most parts of the multistroke feed mechanism are enclosed in a box-like housing 130 having a pair of vertical partitions or bearing walls 132 and 134. The camshaft 32 is of stepped configuration integrally comprising a pair of small-diameter journals 136 and 138 at its opposite ends and, therebetween, three portions 140, 142 and 144 of progressively smaller diameters from the left to the right. Also included is an extension 146 projecting from the right hand end journal 138 and having the drive gear 148, carrying the lift cam 30, splined thereto. The opposite end journals 136 and 138 of the camshaft 32 are received in respective bearings 150 and 152 on the partitions 132 and 134 of the housing 130, so that the camshaft rotates relative to the housing by being driven by the gear drive comprising the gear 148.

The set 70 of four feed cams 70-1, 70-2, 7-3- and 70-4 are fixedly mounted, as with screws 154, on a tubular cam carriage 156 at constant axial spacings. Sleeved upon the camshaft 32, the cam carriage 156 is internally straight-splined at 158 to mesh with splines 160 on the camshaft portion 140 lying next to the left hand end journal 136. The cam carriage 156 with the feed cams 70 thereon is therefore slidable axially of the camshaft while being constrained to simultaneous rotation therewith. An annular space 162 exists between the cam carriage 156 and the camshaft portion 142 adjoining the portion 140 because the portion 142 is less in diameter than the portion 140.

In order to move the cam carriage 156, or the feed cams 70 thereon, axially of the camshaft 32, a movable sleeve 164 is rigidly fastened to the cam carriage in end-to-end relation. The cam carriage 156 and the movable sleeve 164 may be considered as a single unit for the purposes of our invention. Likewise, the feed cams 70 may be considered integral with the cam carriage 156. Mostly encircling the camshaft portion 144, lying next to its right hand end journal 138, in the illustrated condition, the movable sleeve 164 has the inside surface 166 of its thickened left hand end in sliding but fluid-tight contact with the surface of the camshaft portion 142. An annular end cover 168 is secured to the right hand end of the movable sleeve 164. The inside diameter of this end cover is slightly less than that of the movable sleeve 164.

Between the camshaft portion 144 and the movable sleeve 164 there is provided a fixed sleeve 170 closely encircling the camshaft portion 144. The end cover 168 of the movable sleeve 164 fits over the fixed sleeve 170 in sliding but fluid-tight contact therewith. A large diameter portion 172 at the left hand end of the fixed sleeve 170 also makes sliding but fluid-tight contact with the inside surface 174 of the movable sleeve 164. Thus are formed a pair of fluid chambers 176 and 178 on the opposite sides of the large diameter portion 172 of the fixed sleeve 170. Since the fixed sleeve 170 is essentially integral with the camshaft 32, the pair of opposed fluid chambers 176 and 178 can be thought of as being formed between the camshaft and the movable sleeve 164. Upon selective delivery of pressurized fluid into these opposed fluid chambers the movable sleeve travels in either of the opposite axial directions of the camshaft together with the cam carriage 156 and the feed cams 70 thereon. The movable sleeve 164 is substantially integral with the feed cams 70 as aforesaid, so that the opposed fluid chambers 176 and 178 act, essentially, between the camshaft and the feed cams, moving the latter with respect to the former just like the piston of a fluid actuated cylinder.

For fluid flow to and from the right hand fluid chamber 178 the fixed sleeve 170 has an annular recess 180 formed in its inside surface. This annular recess communicates with the right hand fluid chamber 178 via one or more radial bores 182 in the fixed sleeve 170. The left hand fluid chamber 176 and the annular recess 180 in the fixed sleeve are open to respective fluid passages 184 and 186 extending rightwardly through the camshaft 32. The fluid passages 184 and 186 communicate via a swivel coupling 188 at the right hand end of the camshaft with respective conduits 190 and 192. These conduits communicate via a solenoid-operated, four-way, three-position valve 194, FIG. 2, with the pressurized fluid source 108 and the fluid drain 110.

A switch actuator 196 is attached to the end cover 168 of the movable sleeve 164 for movement in the axial direction of the camshaft 32 with the feed cams 70. To be activated by the switch actuator 196 are a row of four switches 198-1, 198-2, 198-3 and 198-4 affixed to a mount 200 extending parallel to the camshaft 32. The spacings between these switches are approximately equal to the center-to-center distances between the feed cams 70. When the cam follower levers 72 and 82 are in engagement with the first feed cam 70-1 as in FIGS. 1 and 2, for example, the switch actuator 186 is positioned to activate the first switch 198-1 seen at the extreme right in FIG. 3. The switch actuator 196 activates the second switch 198-2 when the second feed cam 70-2 is moved to a position for engagement with the cam follower levers 72 and 82, and so forth. The functions of the four switches will become apparent from the subsequent description of operation.

The multistroke feed mechanism of our invention further includes provisions for locking the feed cams 70 against displacement axially of the camshaft 32 in any desired position where one of the feed cams is in working engagement with the cam follower levers 72 and 82. As shown also in FIG. 3, such provisions include a lockpin 202 integral with a piston 204. The lockpin-piston combination is inserted via a bushing 206 in a bore 208 formed radially in the splined portion 140 of the camshaft 32. The piston 204 is flanged to bound, in combination with the bushing 206, a pair of opposed fluid chambers 210 and 212 in the bore 208. These fluid chambers are open to respective fluid passages 214 and 216 extending through the camshaft 32 and communicating with respective fluid passages 218 and 220 formed through a camshaft extension 222 screwed to the left hand end of the camshaft. The fluid passages 218 and 220 are open via a swivel coupling 224 to respective conduits 226 and 228 leading to a solenoid-operated, four-way, three-position valve 230, FIG. 2, for selective communication with the pressurized fluid source 108 and the fluid drain 110. Thus the piston 204 reciprocates in the radial bore 208 in the camshaft 32, with the consequent extension and retraction of the lockpin 202 out of and into the bore.

For receiving the lockpin 202 a series of four lines holes 232-1, 232-2, 232-3 and 232-4 are formed radially and at constant axial spacings through the cam carriage 156. The positions of these lined holes correspond to those of the feed cams 70 on the cam carriage 156.

Operation

The attached drawings represent the multistroke feed mechanism 10 in a state where the main 72 and auxiliary 82 cam follower levers have their rolls 76 and 86 in contact with the first feed cam 70-1. In this state the lockpin 202 is engaged in the first hole 232-1 in the cam carriage 156 to retain the first feed cam 70-1 in contact with the cam follower rolls 76 and 86. The switch actuator 196 is also in engagement with the first switch 198-1. As will be noted from FIGS. 3 and 4 in particular, the lobe of the first feed cam 70-1 is of the greatest radius of the lobes of all the feed cams. Consequently, with the rotation of the camshaft 32, the linkage system 90 causes reciprocation of the feed carrier 62 of the "transfer feeder" over the longest of the four predetermined different strokes.

The feed stroke of the "transfer feeder" can be switched to a shorter one through the following procedure. The solenoid valves 102 and 124 of FIG. 2 are first energized to cause extension of the pair of hydraulic cylinders 96 and contraction of the hydraulic cylinder 98. Upon extension of the cylinder pair 96 the pair of swingable arms 92 of the linkage system 90 swing in a clockwise direction, as viewed in FIG. 2, resulting in the pivotal motion of the main cam follower lever 72 in the same direction and, therefore, in the disengagement of the roll 76 thereon from the first feed cam 70-1. Upon contraction of the cylinder 98, on the other hand, the pusher 116 on its piston rod 118 moves into abutment against the air cylinder 80 and causes the auxiliary cam follower lever 82 to turn counterclockwise, also as seen in FIG. 2, with the consequent disengagement of the roll 86 thereon from the first feed cam.

The solenoid valve 230 is also energized to cause disengagement of the lockpin 202 from the cam carriage 156. Upon communication of the fluid chamber 210 in the camshaft 32 with the drain 110 and of the fluid chamber 212 with the source 108, the piston 204 travels inwardly of the radial bore 208 in the camshaft 32. Thereupon the lockpin 202 retracts out of the first hole 232-1 in the cam carriage 156, setting it free to travel axially of the camshaft 32.

With the above preparatory steps completed, the solenoid valve 194 may now be actuated in a direction to place the fluid chambers 176 and 178, between camshaft 32 and movable sleeve 164, in communication with the source 108 and drain 110 respectively. The fluid pressure in the chamber 176 acts between the opposed surfaces of the movable 164 and fixed 170 sleeves, causing the movable sleeve to slide leftwardly, as viewed in FIG. 3, over the camshaft 32 together with the cam carriage 156 and the feed cams 70 thereon. The switch actuator 196 also travels with the movable sleeve 164.

Let us assume that the feed stroke of the "transfer feeder" is now desired to be changed to the second longest one offered by the second feed cam 70-2. Although the electrical details of the multistroke feed mechanism 10 are not specifically illustrated because of their common and well known nature, we understand that when the switch actuator 196 travels into engagement with the second switch 198-2 on the mount 200, the solenoid valve 194 becomes automatically deenergized to shut off the fluid chambers 176 and 178 and hence to terminate the leftward travel of the feed cams 70. Now the second feed cam 70-2 is positioned for engagement with the rolls 76 and 86 on the cam follower levers 72 and 82. The solenoid valves 102 and 124 are then caused to allow engagement of the rolls 76 and 86 with the second feed cam 70-2. The solenoid valve 230 is also energized to place the fluid chambers 210 and 212 in communication with the source 108 and drain 110 respectively. The result is the projection of the lockpin 201 out of the bore 208 in the camshaft 32 into the second hole 232-2 in the cam carriage 156. The feed cams are thus locked in position against any possibility of displacement in the axial direction of the camshaft during the subsequent run of operation.

As then the camshaft 32 is set into rotation, the second feed cam 70-2 oscillates the main cam follower lever 72 through an angle determined by its contoured periphery. The linkage system 90 transmits this oscillation of the main cam follower lever to the feed carrier 62, causing same to reciprocate over the stroke corresponding to the angle of oscillation of the main cam follower lever. The reciprocating feed carrier makes it possible for the pair of transfer bars 12 to transfer or feed desired articles over the desired second longest unit distance.

Although we have shown and described the multistroke feed mechanism as adapted for the "transfer feeder" of the known triaxial transfer press system, we understand that our invention finds application to other types of machines. We also recognize that a variety of modifications or variations in the details of the illustrated construction will occur to one skilled in the art within the scope of our invention.

We claim:

1. In apparatus for transferring or feeding articles, the apparatus including a feed member which reciprocates for causing such transferring or feeding motion, a multistroke feed mechanism for reciprocating the feed member over any selected one of a plurality of preassigned different strokes, the multistroke feed mechanism comprising:
(a) a rotatable camshaft;
(b) a set of feed cams having differently contoured surfaces and mounted side by side on the camshaft, the feed cams being jointly movable axially of the camshaft while being constrained to simultaneous rotation therewith;
(c) a cam follower arranged for engagement with the contoured surface of one of the feed cams;
(d) means defining a pair of opposed fluid chambers acting between the camshaft and the set of feed cams for moving the latter axially of the camshaft to a desired position where a selected one of the feed cams is engaged by the cam follower; and
(e) a linkage for operatively connecting the cam follower to the feed member in order to cause the latter to reciprocate over a distance determined by the contoured surface of the selected feed cam in engagement with the cam follower.

2. The apparatus of claim 1, wherein the feed cams are in the form of discs, wherein the cam follower is in the form of a lever adapted to be oscillated through angles dictated by the feed cams, and wherein the linkage is adapted to translate the oscillation of the cam follower lever, through the angle determined by the selected feed cam in engagement therewith, into the reciprocation of the feed member over the corresponding distance.

3. The apparatus of claim 2, further comprising means for pivoting the cam follower lever out of engagement with the set of feed cams during the movement of the latter in the axial direction of the camshaft.

4. The apparatus of claims 2 or 3, further comprising:
(a) a second cam follower lever disposed opposite to the first recited cam follower lever across the set of feed cams and pivotable about an axial parallel to an axis about which the first cam follower lever oscillates; and
(b) means acting between the first and second cam follower levers for yieldably urging the cam follower levers against any selected one of the feed cams.

5. The apparatus of claim 4, further comprising means for pivoting the second cam follower lever out of engagement with the set of feed cams during the movement of the latter in the axial direction of the camshaft.

6. The apparatus of claim 4, wherein the yieldably urging means comprises an air cylinder.

7. The apparatus of claim 1, further comprising means for locking the set of feed cams against displacement in the axial direction of the camshaft in any desired position where one of the feed cams is in engagement with the cam follower.

8. The apparatus of claim 7, wherein the locking means comprises:
(a) a tubular cam carriage nonrotatably fitted over the camshaft and carrying the set of feed cams thereon for sliding motion therewith in the axial direction of the camshaft;
(b) there being a plurality of axially spaced holes formed radially in the cam carriage, with the positions of the holes in the cam carriage corresponding to those of the feed cams thereon;
(c) there being a bore formed radially in the camshaft;
(d) a piston slidably fitted in the bore in the camshaft and adapted to bound a second pair of opposed fluid chambers therein whereby the piston is reciprocated in the bore; and
(e) a lockpin provided to the piston thereby to be moved into and out of engagement in any desired one of the holes in the cam carriage.

9. The apparatus of claim 8, further comprising a sleeve fitted over the camshaft and secured to the cam carriage for joint sliding motion therewith in the axial direction of the camshaft, the first recited pair of opposed fluid chambers being formed between the camshaft and the sleeve.

* * * * *